C. V. BUTTERFIELD.
AUDIBLE PRESSURE INDICATOR.
APPLICATION FILED FEB. 18, 1918.
1,296,160.
Patented Mar. 4, 1919.
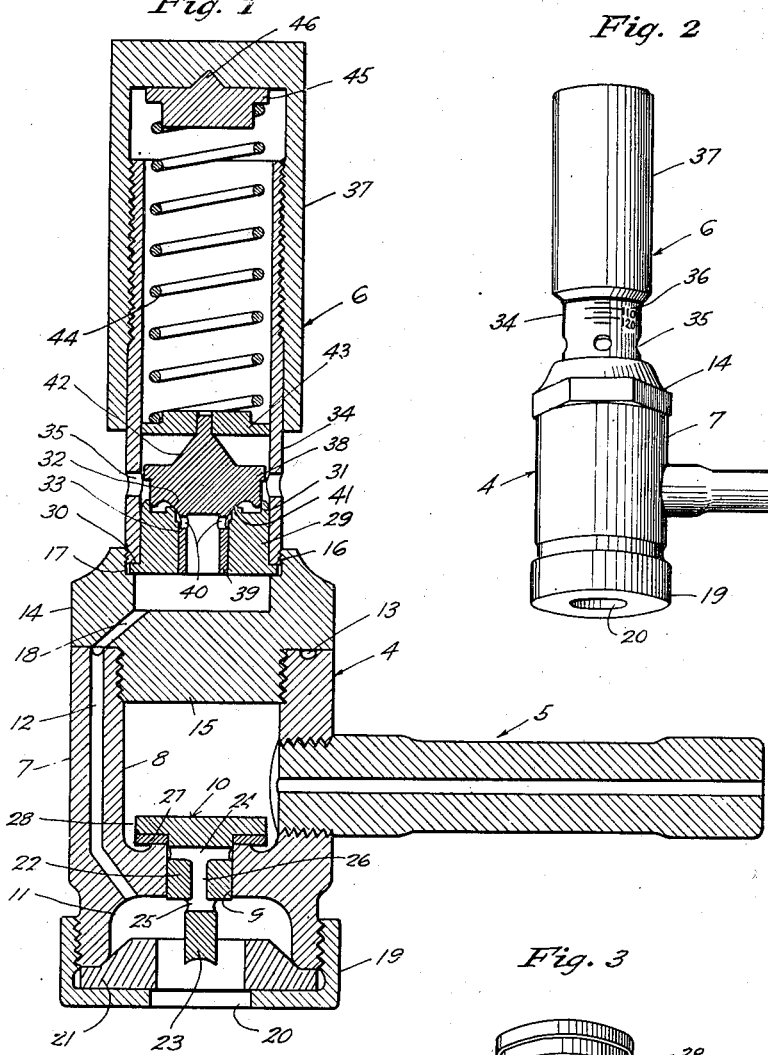
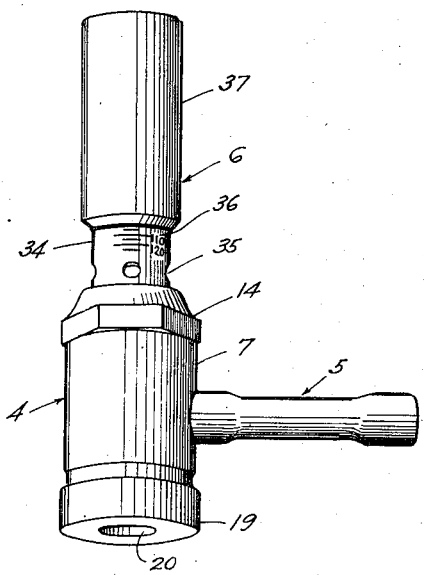
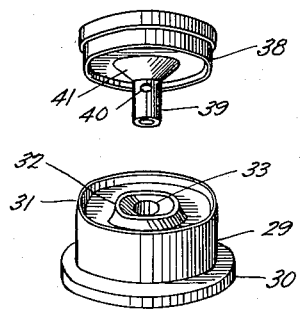
Inventor
Charles V. Butterfield
by Nestall and Wallace
his Attorneys

UNITED STATES PATENT OFFICE.

CHARLES V. BUTTERFIELD, OF LOS ANGELES, CALIFORNIA, ASSIGNOR OF ONE-FOURTH TO EDWARD WIESE, ONE-FOURTH TO EDWARD LYONS, AND ONE-FOURTH TO DOZIER T. BENTLEY.

AUDIBLE PRESSURE-INDICATOR.

1,296,160.      Specification of Letters Patent.      Patented Mar. 4, 1919.

Application filed February 18, 1918. Serial No. 217,790.

*To all whom it may concern:*

Be it known that I, CHARLES V. BUTTERFIELD, a citizen of the United States, residing at Los Angeles, in the county of Los Angeles and State of California, have invented new and useful Improvements in Audible Pressure-Indicators, of which the following is a specification.

This invention relates to a valve, which will give an audible signal when the same is lifted from its seat, and is especially adapted for use in inflating automobile tires, but may be used in any system carrying a gas under pressure.

It is an object of this invention to provide a valve of the nature of a safety valve, which, when lifted, will produce an audible signal continuing over a substantial period of time.

It is a further object of this invention to provide a structure containing said valve, whereby the pressure at which it will operate may be adjusted.

In addition to the broader features of invention, there are certain details of design, whereby compactness, simplicity and durability of structure as well as positiveness and ease of operation are obtained.

An embodiment of my invention is illustrated in the accompanying drawing, in which:

Figure 1 is a vertical section through a hose connection having my improved valve signal embodied therein. Fig. 2 is a perspective view of the connection shown in Fig. 1. Fig. 3 shows in perspective the audible valve and its seat.

Referring more particularly to the drawing, 4 indicates the body of the connection, which is adapted to be placed in communication with the tire valve. A nipple connection 5 serves for communication with the source of air pressure. The air gage proper is indicated by 6.

The body 4 comprises a shell 7 having a bore 8, which is reduced in diameter at the bottom to form an air port 9 and a seat for a valve 10. At the bottom of the shell the bore is enlarged in diameter as indicated by 11 to form a cavity. Extending from the enlarged portion 11 of the bore longitudinally to the upper face of the shell is a port 12. Formed upon the upper face of the shell is an annular channel 13, which communicates with the port 12. The bore of the shell 7 is threaded at the upper end. A cap 14 for the shell has depending therefrom an extension 15 which is threaded on its exterior and screwed into the bore of the shell. The cap 14 has a bore 16 which is threaded and is reduced at its lower end to form a shoulder 17. A port 18 establishes communication between the port 12 and the bore 16. It is not necessary to have the ports 12 and 18 register as the channel 13 provides for communication of the ports regardless of their relative position. The lower part of shell 7 is externally threaded and receives a cap 19. Cap 19 is provided with an opening 20 at the center thereof. A rubber gasket 21 is clamped between the cap 19 and the shell 7. A lateral bore is threaded and connected therein is the hose nipple 5 through which air is supplied to the bore 8. Mounted within the bore 8 is a valve 10 which comprises a disk having a stem 22. The stem 22 is flattened at the lower end as indicated by 23.

Transverse bores 24 and 25 are connected by a longitudinal bore 26 in the valve stem. As the valve stem closely fits the reduced portion of the bore 9, the ports 24, 26 and 25 serve to permit air to pass from the bore 8 into the cavity 11 thereof. Secured to the lower face of the valve 10 is a gasket 27 which is held in place by a collar 28 shrunk upon the disk.

Disposed in the bore 16 of the shell 7 and resting upon the shoulder 17 is a valve seat member 29. The seat member 29 is of tubular form enlarged at the bottom to form a shoulder 30. There is a double seat formed on the seat member 29, the seat member being bored to form a vertical knife edge seat 31 and bevel seat 32 at the air port 33 which extends through the seat. Screwed into the bore 16 is a tubular member 34 which clamps the collar of the seat member in position. The tubular member 34 is provided with openings 35 and a scale 36 upon the face thereof. The upper end of the tubular member 34 is threaded and mounted thereon is the adjustable cap 37, which may be screwed up or down.

A valve disk 38 having a hollow stem 39 disposed in the bore 33 of the seat member 29, is provided with lateral openings 40. Coöperating with the bevel seat 32 is the seat portion 41 of the valve. The valve disk 38 is of such diameter that it slips within the seat 31 and forms therewith the second seat. The knife edge 31 is of such height that the valve first uncovers the bevel seat 32. Upon the upper face of the valve disk 38 is a stem 42 upon which is mounted a washer 43 providing a seat for the compression spring 44. At the head of compression spring 44 is an abutment washer 45 which engages the cap 37. The washer is provided with a spur 46 which is disposed in a recess in the head of the cap 37, and thereby is maintained in its central position.

To use the connection, the cap 37 is moved into position to produce the desired pressure of the spring 44. The graduation on the scale 36 on tubular member 34 which registers with the lower edge of the cap 37 indicates the pressure at which the gage will operate. The connection is now slipped over the tire valve which enters the opening 20 in the cap 19 of the body, the valve being gripped by the washer 21 which makes an air tight joint. The flattened end 23 of the valve stem engages the stem of the tire valve, and the valve 10 is lifted from its seat permitting air which enters from the air hose, not shown, to pass through the nipple 5 to the bore 8, through the ports 24, 26 and 25 of the valve into the tire. The pressure in cavity 11 is that of the tire as the cross-sectional area of the opening in nipple 5 is less than that of any of the openings through which the air must travel to enter the tire. The air pressure is communicated through ports 12 and 18 to the bore in the cap 14 of the body. The air pressure acts upon the stem of the valve 38, and when it becomes sufficiently great, it lifts the valve against the pressure of spring 44. The seat 32 is first uncovered, the air pressure then acting upon the added area extending to the seat 31. The pressure upon the valve is thereby increased and the valve is lifted to uncover the outer seat, air then escaping through openings 35. The pressure then drops in the cavity 16 and the valve is again forced upon its seats by the spring 44. In the meantime air flows through the ports 12 and 18 to the cavity and pressure is again increased upon the valve 38. The result is that valve 38 is again lifted. This movement of the valve up and down on its seat causes a fluttering, whose period by proper designing of the valve seat and port is so high that a humming noise is produced. As soon as the humming noise is heard, the connection should be removed from the tire valve, whereupon valve 10 is forced to its seat and closes the port 9. By turning the cap 37 so that the pressure indicated by the graduation which appears at the lower edge of the cap is that of the pressure desired, then the pressure of the spring 44 upon the valve 38 is adjusted to permit the valve to be lifted at that pressure, and the signal to be given. However, I do not limit myself to this particular means of adjusting the spring pressure.

It is obvious that I have constructed a gage, which gives a positive audible signal and will continue to do so until the pressure drops to that for which the gage is set.

What I claim is:

1. In a device of the class described, the combination of a body provided with a chamber having an air inlet, and being provided with an outlet chamber having a discharge outlet, a lifting valve controlling communication between said chambers; and a gage comprising a valve seat member having a double seat, the outer one of which is a vertical knife seat, the air port of said seat member being in communication with said outlet chamber, a disk valve coöperating with said seat, and adjustable resilient means tending to hold said valve disk on its seat.

2. In a device of the class described, the combination of a body provided with a chamber having an air inlet, and being provided with an outlet chamber having a discharge outlet, a lifting valve controlling communication between said chambers; and a gage comprising a valve seat member having a double seat, the outer one of which is a vertical knife edge seat, the air port of said seat member being in communication with said outlet chamber, a disk valve coöperating with said seat member, a compression spring tending to hold said valve on its seat, and means to adjustably vary the pressure of said spring.

3. In a device of the class described, the combination of a body provided with a chamber having an air inlet, and being provided with an outlet chamber having an air discharge outlet, a lifting valve controlling communication between said chambers; a gage comprising a valve seat member having an air port at the center thereof and two concentric seats, the outer one of which is a vertical knife edge seat, a valve disk having a knife edge coöperating with said knife edge seat and so arranged that the disk first uncovers the inner seat, and adjustable resilient means to hold said valve on its seat.

4. In a device of the class described, the combination of a body provided with a chamber having an air inlet, and being provided with an outlet chamber having a discharge outlet, a lifting valve controlling communication between said chambers; and a gage comprising a valve seat member having an air port at the center thereof and two concentric seats, the outer one of which is a vertical knife edge seat, a valve disk having a knife edge coöperating with said knife edge seat and so arranged that the disk first uncovers the inner seat, a compression spring tending to hold said valve to its seat, and means to adjustably vary the pressure of said spring.

5. A gage comprising a valve seat member having an air port and a double seat, the outer one of which is a vertical knife seat, a valve disk having a knife edge coöperating with said knife edge seat and so arranged that the disk first uncovers the inner seat, and adjustable resilient means to hold said valve on its seat.

6. A gage comprising a valve seat member having an air port at the center thereof and two concentric seats, the outer one of which is a vertical knife edge seat, a valve disk having a knife edge coöperating with said knife edge seat and so arranged that the disk first uncovers the inner seat, a compression spring tending to hold said valve to its seat, and means to adjustably vary the pressure of said spring.

7. A gage comprising a valve seat member having an air port at the center thereof and two concentric seats, the outer one of which is a vertical knife edge seat, a valve disk having a knife edge coöperating with said knife edge seat and so arranged that the disk first uncovers the inner seat, said valve having a stem thereon extending into said air port and guided thereby, a compression spring tending to hold said valve to its seat and means to adjustably vary the pressure of said spring.

In witness that I claim the foregoing, I have hereunto subscribed my name, this 23rd day of January, 1918.

CHARLES V. BUTTERFIELD.